United States Patent Office 3,416,907
Patented Dec. 17, 1968

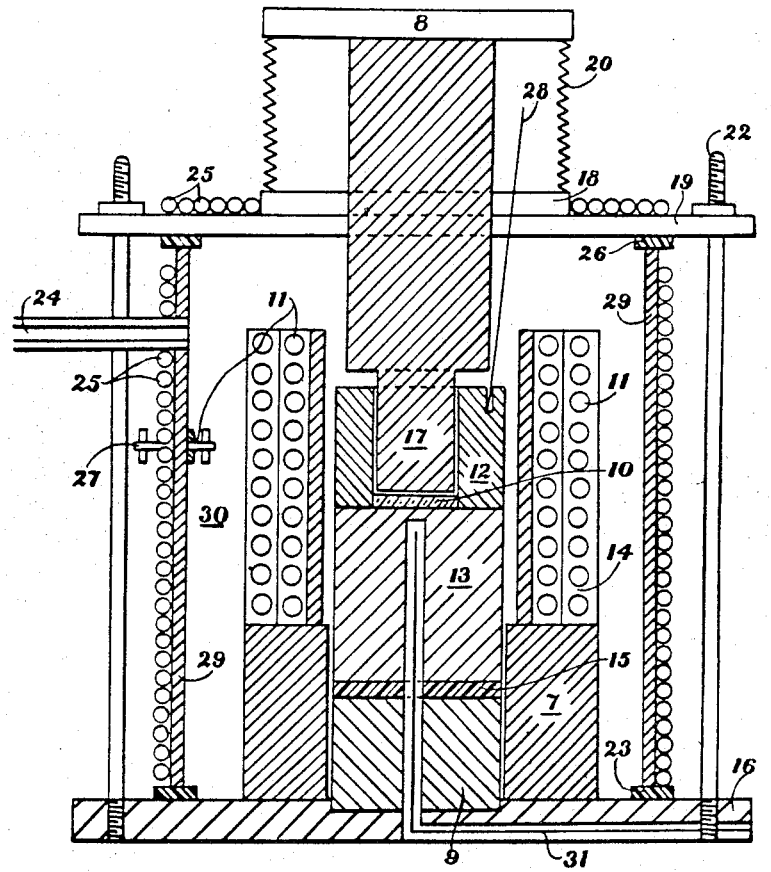

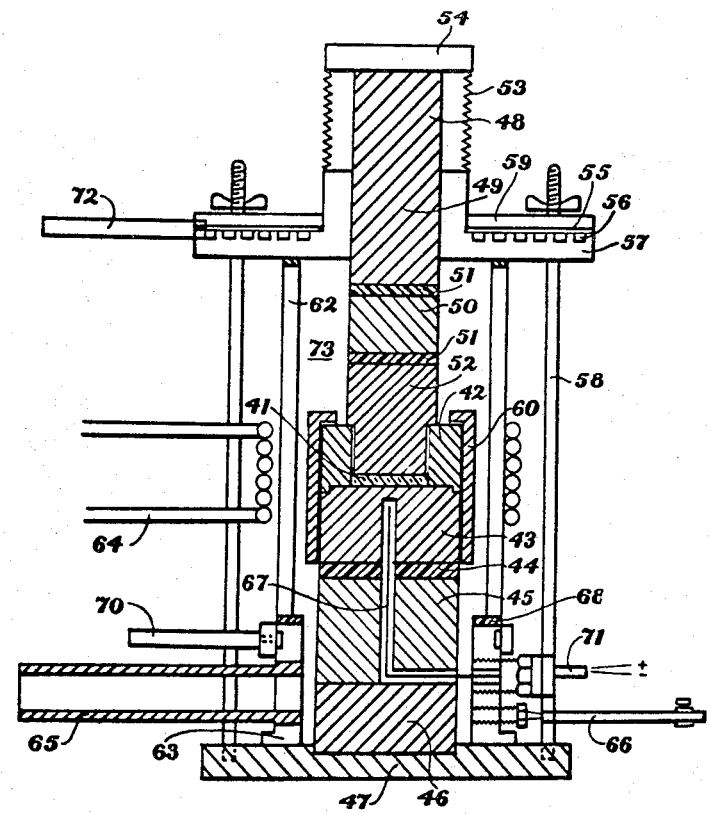

3,416,907
METHOD OF FORMING ZINC OXIDE INFRARED TRANSMITTING OPTICAL ELEMENT
Edward Carnall, Jr., and Donald W. Roy, Rochester, N.Y., assignors to Eastman Kodak Company, Rochester, N.Y., a corporation of New Jersey
Original application Oct. 19, 1961, Ser. No. 146,186. Divided and this application June 30, 1965, Ser. No. 484,144
6 Claims. (Cl. 65—32)

ABSTRACT OF THE DISCLOSURE

A method for making infrared transmitting optical elements consisting of hot pressing homogeneous transparent polycrystalline zinc oxide powder in an inert atmosphere or in a vacuum.

---

This is a division of application Ser. No. 146,186, filed Oct. 19, 1961, now abandoned.

This invention relates to optical elements and to methods for making optical elements. More particularly, this invention relates to methods for hot pressing transparent polycrystalline optical elements of various geometrical shapes under high pressures, temperatures and vacuum from zinc oxide powder. These elements may be employed as windows in missiles and projectiles and related devices requiring such infrared refracting optics. These windows are also useful as substrates for optical filters. Zinc oxide windows produced by our process are very stable to thermal shock and temperature extremes and have desirable transmittance characteristics.

An object, therefore, of the present invention is to provide an article of manufacture consisting essentially of transparent polycrystalline zinc oxide.

Another object is to provide a homogeneous solid of polycrystalline zinc oxide having a density of from 99% up to and including the theoretical density.

Still another object is to provide a molded optical element which transmits in the visible and infrared regions of the electromagnetic spectrum.

Another object is to provide an infrared transmitting element which will be suitable for use in missiles, projectiles, satellites and related devices.

Yet another object is to provide a method of hot pressing zinc oxide to form such optical elements.

In accordance with a feature of this invention, zinc oxide powder is hot pressed in a compression mold under condition of high pressure, high temperature and high vacuum or inert atmosphere into a solid molded unit of transparent polycrystalline zinc oxide. The mold may be of any suitable shape to form a window or a lens of desired contour.

The invention will be further understood by reference to the following detailed description and drawings in which:

FIG. 1 is a view of a transparent polycrystalline solid molded from zinc oxide powder;

FIG. 2 is an elevational view, partly in section, of a compression molding device for molding zinc oxide powder in accordance with this invention;

FIG. 3 is an elevational view, partly in section, of a compression molding device for molding zinc oxide powder into optical units which employs high-frequency heating.

The molding apparatus shown in FIG. 2 comprises a base 16, a silicone gasket 23, a block 9, a thermal insulator 15, a block 13, a molding cylinder 12, a molding plunger 17, having a head 8 which is adapted to be attached to a prime mover, not shown, such as the piston of a hydraulic press to move the plunger 17 vertically into and out of molding cylinder 12 and thereby press the zinc oxide powder into the solid unit shown at 10.

The head 8 is attached to aligning ring 18 by metal bellows 20 thereby assuring a vacuum seal around the upper portion of the plunger 17.

A cylinder 21 encloses the molding cylinder 12 and lower portion of the plunger 17 and is supported on block 7. A heating unit 14 comprising a refractory casing is positioned around cylinder 21 and is also supported on block 7 and contains electric heating coils 11, the terminals for which are shown at 27.

A cylinder 29 is positioned concentrically in respect to cylinder 21 and forms a vacuum chamber 30, the ends of which are closed by gaskets 23 and 26 and plates 16 and 19. Cooling coils 25 are positioned in contact with the outer surface of cylinder 29. A conduit 24 connects the vacuum chamber 30 to a suitable vacuum system not shown. The assembly is further secured by the coaction of top plate 19 and threaded rods 22 and base plate 16.

The temperature is measured by either one or by both thermocouples 28 and 31 which are suitably located in channels respectively positioned adjacent the molding position.

The block 9 and cylinder 12 may be made of molybdenum, molybdenum alloy, Nichrome or stainless steel. Block 13 and plunger 17 may be made of molybdenum alloy or super alloy.

A satisfactory hot pressed, transparent polycrystalline zinc oxide window may be made employing the apparatus shown in FIG. 2 as follows:

Zinc oxide powder is introduced in the cavity of cylinder 12 beneath plunger 17. Chamber 30 is evacuated through pipe 24. Next cooling water is circulated through the cooling coils 25 and also through the platens, not shown, of the hydraulic press, and then electric current is supplied to the heater coils 11 through terminals 27. The temperature of the mold is monitored by means of platinum-rhodium thermocouples 28 and 31. When the temperature of thermocouple 28 reaches 700° C., force is applied to the head 8 of plunger 17 by the hydraulic press, not shown, and the pressure is raised on the zinc oxide powder to approximately 45,000 p.s.i. This pressure is maintained on the zinc oxide for from 10 to 40 minutes while the temperature is held at 700° C. At the end of the pressing period, the power is shut off and the pressure is released slowly. The vacuum pump is shut off and argon, or other inert gas, is bled into chamber 30. The assembly is allowed to cool to about 300° C. as recorded by the thermocouples.

The plunger 17 is now withdrawn from the cylinder 12 and the piece of polycrystalline transparent zinc oxide 10 is permitted to cool to approximately room temperature and is removed from the apparatus and employed as desired.

Referring to FIG. 3, an elevational view, partly in section, of another modification of the molding apparatus is shown. This modification employs high frequency heating. In general, however, the parts of the apparatus are similar in kind and operation to that shown in FIG. 2.

The pressed zinc oxide powder is shown at 41. The apparatus comprises molding cylinder 42, molding block 43, insulator 44 and supporting blocks 45 and 46. Block 46 rests on base 47. A graphite sleeve 60 is positioned between induction heating coils 64 and members 42 and 43. Also positioned on base 47 is a cylindrical chamber 63 through which vacuum conduit 65, a vacuum release conduit 66 and a thermocouple conduit 71 extend. A water pipe 70 connects the chamber 63 to a water supply, not shown. The thermocouple is shown at 67. A quartz cylinder 62 is positioned on member 63 and separated therefrom by a gasket 68. Cylinders 62 and 63 thus form a vacuum chamber 73, the upper portion of which is closed by plate 57 having water cooling channels 56 therein. A gasket 55 forms the upper surface of the channels 56 and is held in position by clamping plates 59. The assembly is clamped by a plurality of clamping rods 58 and cooperating wing nuts.

The molding plunger 48 extends through an aligning aperture in plate 57. Freedom of motion of the plunger and a vacuum seal are achieved by means of the metal bellows 53, the ends of which are sealed respectively to the head 54 of the plunger 48 and to plate 57.

The molding plunger assembly 48 comprises three sections; section 49 is preferably made of Nichrome or stainless steel; section 50 of Nichrome and section 52 of molybdenum or molybdenum alloys. Thermal insulators 51 are positioned between sections 49 and 50 and between sections 50 and 52. The various plunger sections are held together by threaded pins.

Top plates 57 and 59 and the base plate 47 may be of aluminum. Cylinder block 42 and block 43 preferably are of molybdenum alloys, block 45 of Nichrome and block 46 of stainless steel. The insulators 44 and 51 are of Transite or of material of similar or superior thermal insulating properties which will withstand the high temperatures and pressures involved.

Since molybdenum does not couple the high-frequency field efficiently, a graphite sleeve 60, which fits snugly over the molding cylinder is employed. The high-frequency field couples and heats the graphite which in turn heats the molding cylinder by thermal conduction.

If a situation arises in which it is desirable to eliminate the graphite susceptor 60, it is preferable to make the plunger section 52, cylinder 42 and block 43 of a material which couples efficiently with the high-frequency field. Materials such as the high temperature nickel base alloys may be used.

The apparatus of FIG. 3 is operated at substantially the same schedule of temperature, pressure and vacuum as described above, but due to the high-frequency heating, the heating cycle can be considerably reduced.

Induction heating is also advantageous in that inert atmospheres can be used more rapidly than with resistance heating. When employing a molding cylinder which efficiently couples the high frequency field, the graphite shield need not be used.

The above-described hot pressing operations give optimum results. However, satisfactory transparent, polycrystalline zinc oxide windows have been produced at temperatures varying from 600° C. to 750° C.

Pressures have been varied from about 30,000 p.s.i. to 45,000 p.s.i. Pressure less than 30,000 p.s.i. may result in a window that is not completely pressed to a homogeneous mass. Any pressure in excess of the optimum 45,000 p.s.i. does not seem to contribute to the quality of the window.

The time at pressing temperature has been varied within the limits of about 10 to 40 minutes. At times less than 5 minutes, the windows may not be pressed out.

Limits are imposed on hot pressing by the available mold materials. The plunger, cylinder 12 and block 13 must all be strong at high temperatures and must be inert to zinc oxide. An alloy made of molybdenum and titanium may be used for pressing zinc oxide.

Zinc oxide of high purity gives much better results than that of lower purity and the powder preferably is of submicron size.

A major problem in the hot-pressing work is the unwanted bonding between the zinc oxide and mold parts. Some cracking of zinc oxide windows has occurred because of bonding to the molybdenum mold parts. It has been found effective to cover the parts of the mold contacting the zinc oxide with a light coat of graphite. This prevents sticking and cracking. It may also be helpful to line the mold cavity with a thin foil of a material such as tungsten.

Zinc oxide windows may be sealed into metal rings to provide infrared transmitting windows hermetically sealed to the metal. The metal may be used as a mounting surface.

Properties of zinc oxide:
   Color _____ Water white.
   I.R. transmission ___ From visible to about 4.5 microns, dependent on purity.
   Index of refraction__ 2.0.
   Reflection loss _____ 20%.
   Hardness _____ 4–4.5 Mohs' scale.
   Density _____ 5.7.
   Thermal shock ____ Good.
   High temperature resistance _____ Good.
   Coefficient of expansion _____ About the same as quartz.
   Solubility _____ Soluble in acids.
   Workability, i.e., grinding and polishing _____ Usual optical methods.
   Thermal conductivity _____ 0.011 cal. Sec.$^{-1}$ °C.$^{-1}$ cm.$^{-2}$ cm. at 1000° C.

Special applications—transparent phosphor, filter substrate, prisms, etc.

Zinc oxide powder may be pressed in accordance with this invention in various geometrical shapes and sizes. Cylindrical pieces varying in diameter have been pressed. Lenses may be pressed in carefully polished molds with accurate radius of curvature and the resulting pressing will have a finished optical surface within close tolerance. However, lenses may be also optically polished in the usual manner. The size and shapes of hot pressed zinc oxide pieces are not limited except by available apparatus and large diameter intricately-shaped pieces may be formed. Zinc oxide lenses may be made in clusters.

In addition to the use of polycrystalline zinc oxide windows in missiles and other devices, many other uses are envisioned for this hot pressed material. Spherical domes, lenses, prisms and other optical shapes may be made. Also, it may be sealed into metal rings to provide infrared transmitting windows hermetically sealed into the metal ring. The metal may in turn be used as a mounting surface.

We claim:

1. The method of forming a transparent homogeneous solid of molded zinc oxide having a density in the range of from 99% up to and including theoretical density which comprises molding zinc oxide powder in an inert atmosphere under a pressure of at least 30,000 pounds per square inch and at a temperature within the range of 600° C. to 750° C.

2. The method of forming a homogeneous transparent polycrystalline solid of zinc oxide having a density in the range of from 99% up to and including theoretical density which comprises hot pressing zinc oxide powder under a pressure within the range of 30,000 to 45,000 pounds per square inch at a temperature within the range of 600° C. to 750° C. while in an inert atmosphere.

3. The method of forming a homogeneous transparent polycrystalline solid of zinc oxide having a density in the range of from 99% up to and including theoretical density which comprises hot pressing zinc oxide powder under a pressure of approximately 40,000 pounds per square inch at a temperature of 700° C. while in an inert atmosphere.

4. The method of forming a transparent homogeneous solid of molded zinc oxide having a density in the range of from 99% up to and including theoretical density which comprises molding zinc oxide powder in a vacuum under a pressure within the range of from 30,000 to 45,000 pounds per square inch and at a temperature within the range of 600° C. to 750° C.

5. The method of forming a homogeneous transparent polycrystalline solid of zinc oxide having a density in the range of from 99% up to and including theoretical density which comprises hot pressing zinc oxide powder under a pressure within the range of 30,000 to 45,000 pounds per square inch at a temperature within the range of 600° C. to 750° C. while in a vacuum.

6. The method of forming a homogeneous transparent polycrystalline solid of zinc oxide having a density in the range of from 99% up to and including theoretical density which comprises hot pressing zinc oxide powder under a pressure of approximately 40,000 pounds per square inch at a temperature of 700° C. while in a vacuum.

References Cited

UNITED STATES PATENTS

| | | | |
|---|---|---|---|
| 3,116,137 | 12/1963 | Vasilos et al. | 65—23 |
| 3,131,238 | 4/1964 | Carnall et al. | 264—1 |
| 3,206,279 | 9/1965 | Carnall | 264—332 |
| 3,236,595 | 2/1966 | Carnall et al. | 23—201 |
| 3,294,878 | 12/1966 | Carnall et al. | 264—1 |

OTHER REFERENCES

Kreidl et al: Fabrication of Infrared Transmitting Materials by Hot Pressing Techniques, Bausch and Lomb, June 2, 1959, pp. iii–13 (2641).

DONALL H. SYLVESTER, *Primary Examiner.*

EDWARD R. FREEDMAN, *Assistant Examiner.*

U.S. Cl. X.R.

65—18